US008922891B2

(12) United States Patent
Noguchi

(10) Patent No.: US 8,922,891 B2
(45) Date of Patent: Dec. 30, 2014

(54) BINOCULARS HAVING IMAGE STABILIZING FUNCTION

(75) Inventor: Kazuhiro Noguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 642 days.

(21) Appl. No.: 12/886,085

(22) Filed: Sep. 20, 2010

(65) Prior Publication Data
US 2011/0069386 A1 Mar. 24, 2011

(30) Foreign Application Priority Data

Sep. 24, 2009 (JP) ................. 2009-219773

(51) Int. Cl.
G02B 27/64 (2006.01)
G02B 23/18 (2006.01)

(52) U.S. Cl.
CPC .............. G02B 23/18 (2013.01); G02B 27/646 (2013.01)
USPC .......................................... 359/557; 359/407

(58) Field of Classification Search
CPC .......... G02B 7/02–7/028; G02B 23/18; G02B 25/00–25/008; G02B 27/64–27/648; G03B 2205/0007; G03B 2205/0015
USPC ......... 359/822, 407–418, 480–482, 554–557; 348/208.99
See application file for complete search history.

(56) References Cited

U.S. PATENT DOCUMENTS

| 5,917,653 | A | * | 6/1999 | Taniguchi | 359/557 |
| 5,923,396 | A | * | 7/1999 | Ulvio | 359/409 |
| 6,118,585 | A | * | 9/2000 | Kanai | 359/557 |
| 2001/0028516 | A1 | * | 10/2001 | Noguchi | 359/823 |
| 2002/0037165 | A1 | * | 3/2002 | Wada et al. | 396/53 |
| 2002/0089749 | A1 | * | 7/2002 | Hirunuma et al. | 359/557 |
| 2002/0196544 | A1 | * | 12/2002 | Notagashira | 359/557 |
| 2003/0035230 | A1 | * | 2/2003 | Yamanouchi et al. | 359/819 |
| 2003/0231393 | A1 | * | 12/2003 | Yamamoto et al. | 359/557 |
| 2004/0136068 | A1 | * | 7/2004 | Haga | 359/554 |

FOREIGN PATENT DOCUMENTS

| JP | 10-020213 A | 1/1998 |
| JP | 10-301035 A | 11/1998 |
| JP | 2002-098911 A | 4/2002 |
| JP | 2007-193374 A | 8/2007 |

OTHER PUBLICATIONS

Office Action Issued in Counterpart Japanese Patent Application No. 2009-21773 dated Oct. 22, 2013.

* cited by examiner

Primary Examiner — Stephone B Allen
Assistant Examiner — Jeffrey Madonna
(74) Attorney, Agent, or Firm — Rossi, Kimms & McDowell LLP

(57) ABSTRACT

Binoculars includes left and right image stabilizing lenses, a lens holder configured to move in a direction orthogonal to an optical axis direction, a reference member as a positioning reference in an optical axis direction of the lens holder, a plurality of balls provided at least three each around each of the left and right image stabilizing lenses between the lens holder and the reference member, and configured to roll in accordance with a move of the lens holder, and left and right biasing members inside of the three balls in the left and right ball units and configured to press the lens holder and the reference member against the balls. A coupling portion in the lens holder is so flexible that at least three balls can contact the lens holder by the left and right biasing members.

5 Claims, 9 Drawing Sheets

BINOCULARS HAVING IMAGE STABILIZING FUNCTION

BACKGROUND OF THE INVENTION

1. Field of the Invention

The present invention relates to binoculars having an image stabilizing function configured to reduce (or correct) image vibrations caused by hand blurs.

2. Description of the Related Art

Usually, a user manually holds binoculars in using the binoculars. Thus, an image stabilizing function configured to reduce image vibrations caused by hand blurs can improve the usability of the binoculars when the image stabilizing function is installed in the binoculars. The image stabilizing function of the binoculars is implemented by moving, through an actuator, parts of left and right optical systems orthogonal to an optical axis so that the image vibrations caused by the vibrations of the binoculars can be cancelled or reduced.

In the binoculars, a pair of similarly configured optical systems are arranged on the left side and the right side, and optical images formed by the left and right optical systems are simultaneously observed by both eyes. It is thus necessary to simultaneously stabilize images in the left and right optical systems.

Japanese Patent Laid-Open Nos. ("JPs") 10-020213 and 10-301035 disclose binoculars configured to guide a lens holder configured to integrally hold left and right image stabilizing lenses, in two directions orthogonal to the optical axis by inserting a guide shaft held by one of the lens holder and the base member into a hole formed in the other of the lens holder and the base member.

However, in the guide structure for the lens holder in the binoculars disclosed in JPs 10-020213 and 10-301035, the lens holder displaces in the optical axis direction due to a gap between the guide shaft and the hole. In particular, when the lens holder that holds the left and right image vibrating lenses displaces oblique to or inclines relative to the optical axis direction, the focuses and sizes of the left and right optical images formed by the left and right optical systems become different, causing a sense of discomfort to a user who is observing these images with his both eyes.

In addition, a sliding friction occurs between the guide shaft and the hole, and causes driving resistance that is disadvantageous to fine driving of the lens holder by the actuator.

SUMMARY OF THE INVENTION

The present invention provides binoculars configured to reduce driving resistance of a lens holder in an image stabilizing function and to enables both eyes to observe good optical images.

Binoculars according to one aspect of the present invention includes a left optical system that includes a left image stabilizing lens, a right optical system that includes a right image stabilizing lens, a lens holder configured to move in a direction orthogonal to an optical axis direction, the lens holder including a left lens holding member configured to hold the left image stabilizing lens, a right lens holding member configured to hold the right image stabilizing lens, and a coupling portion configured to couple the left and right lens holding members to each other, a reference member configured to serve as a positioning reference in an optical axis direction for the lens holder, a left ball unit provided at least three each around the left image stabilizing lenses between the lens holder and the reference member, and configured to roll in accordance with a move of the lens holder, a right ball unit provided at least three each around the right image stabilizing lenses between the lens holder and the reference member, and configured to roll in accordance with a move of the lens holder, a left biasing member configured to apply a biasing force so as to press the lens holder against the balls, and a right biasing member configured to apply a biasing force so as to press the lens holder against the balls, wherein the coupling portion in the lens holder is flexible so that at least three balls arranged around each of the left and right image stabilizing lenses can deform and contact the lens holder due to the biasing forces of the left and right biasing members.

Further features of the present invention will become apparent from the following description of exemplary embodiments with reference to the attached drawings.

DESCRIPTION OF THE EMBODIMENTS

Figure 3:
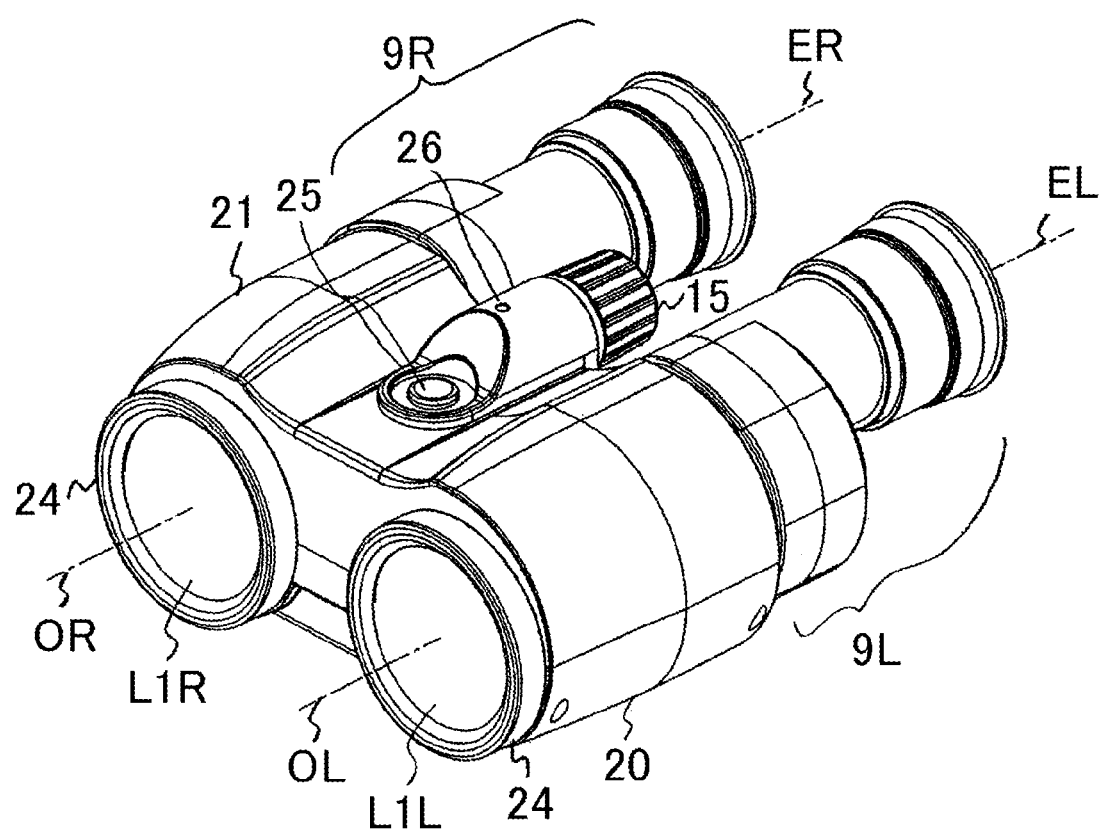
FIG. 3 is a perspective overview of binoculars according to the first embodiment.
Figure 4:
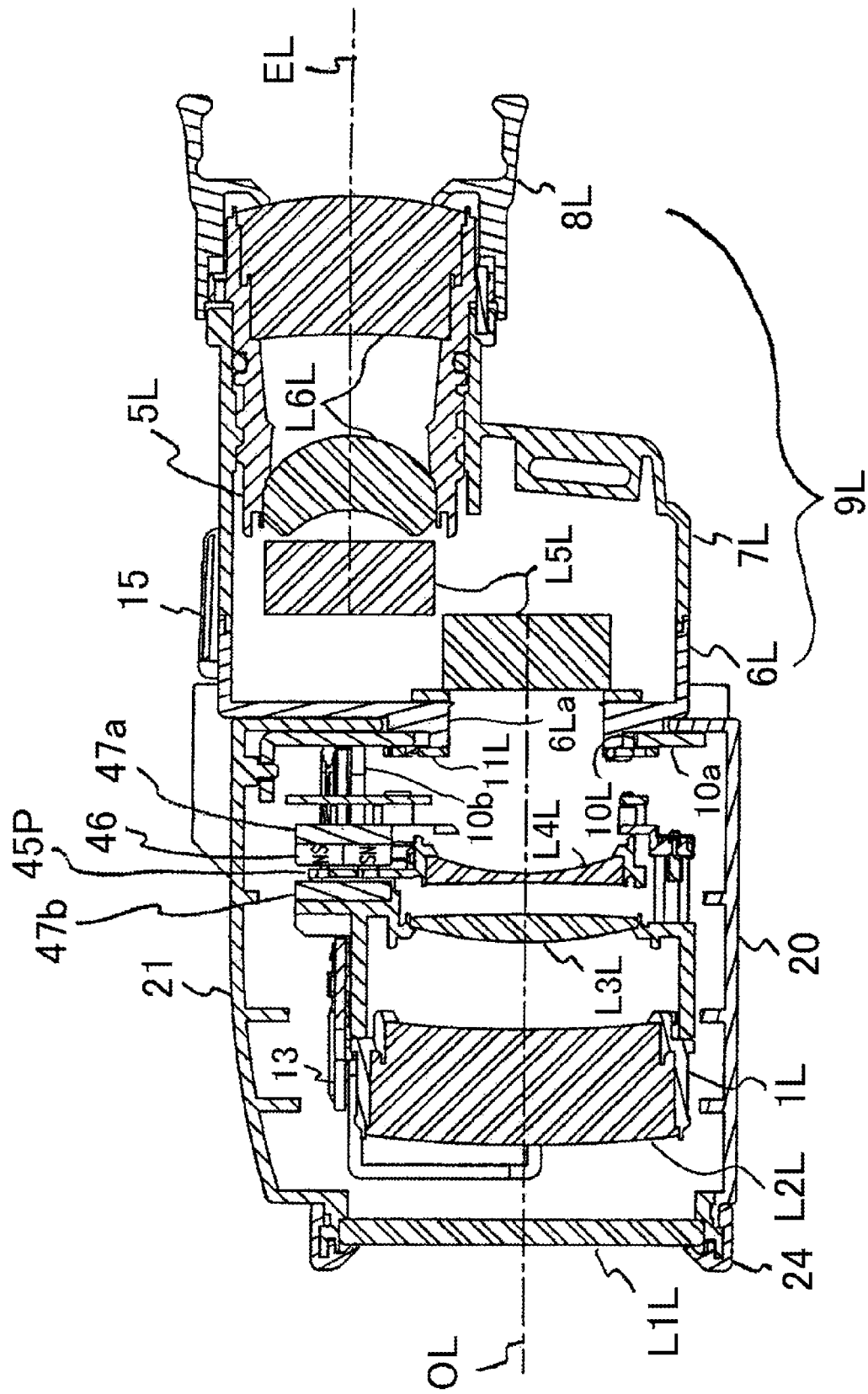
FIG. 4 is a sectional view of the binoculars according to the first embodiment.
Figure 5:
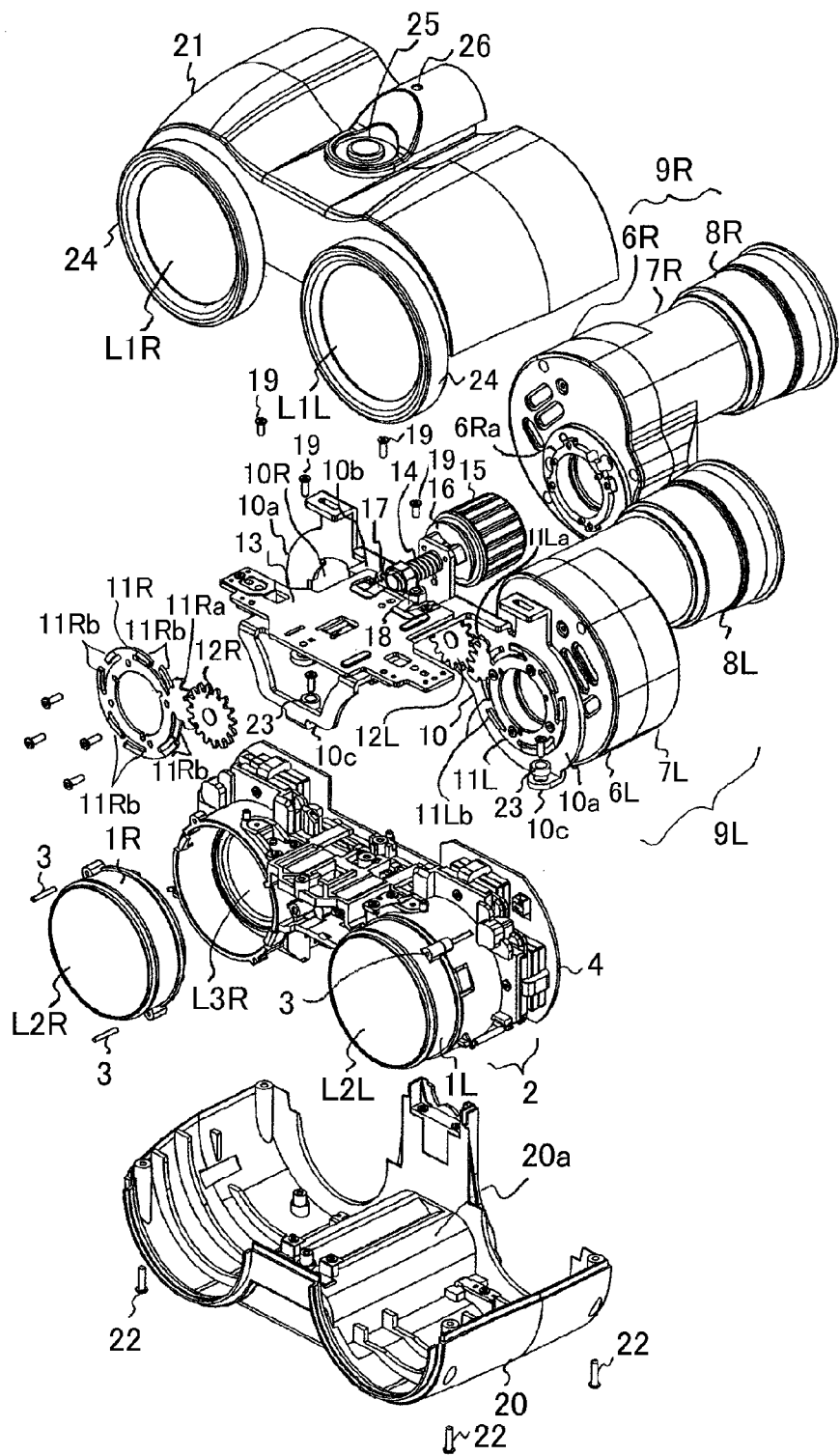
FIG. 5 is an exploded perspective view of the binoculars according to the first embodiment.

Referring now to the accompanying drawings, a description will be given of an embodiment of the present invention.
First Embodiment FIGS. 3, 4, and 5 illustrate a structure of binoculars according to an embodiment of the present invention. FIG. 3 illustrates an overview of the binoculars. "OL" illustrated by an alternate long and shot dash line denotes an optical axis of a left objective optical system, and "OR" denotes an optical axis of a right objective optical system. "EL" denotes an optical axis of a left eyepiece optical system, and "ER"

denotes an optical axis of a right eyepiece optical system. The left and right correspond to left and right of both eyes for observing the binoculars.

FIG. 3 illustrates that an interval between the optical axes OL and OR of the left and right objective optical systems is equal to that between the optical axes EL and ER of the left and right eyepiece optical systems. FIG. 4 illustrates a section of the binoculars illustrated in FIG. 3 taken along a plane containing the left optical axis OL of the objective optical system and the left optical axis EL of the eyepiece optical system. FIG. 5 illustrates exploded binoculars.

A description will now be given of structures of the left and right optical systems in the binoculars. Reference numerals L1L and L1R denote left and right protective glasses. Reference numerals L2L and L2R denote left and right front lenses, and reference numerals L3L and L3R denote left and right fixed lenses. Reference numerals L4L and L4R denote left and right image stabilizing lenses (movable lenses) which constitute parts or all of the left and right objective optical systems. The lenses L2L, L3L, and L4L constitute the left objective optical system, and the lenses L2R, L3R, and L4R constitute right objective optical system. Thus, the left and right objective optical systems are formed.

Reference numerals L5L and L5R denote left and right polo II type prisms of left and right erecting optical systems. Reference numerals L6L and L6R denote left and right eyepiece lenses of the left and right eyepiece optical systems. An optical axis of the left eyepiece lens L6L accords with the optical axis EL of the left eyepiece optical system, and an optical axis of the right eyepiece lens L6R accords with the optical axis ER of the right eyepiece optical system. Thus, the left and right observing optical systems are formed.

A description will now be given of a mechanical structure. Reference numerals 1L and 1R denote front barrels configured to hold front lenses L2L and L2R. Reference numeral 2 denotes an image stabilizer unit (vibration correction unit), which includes the left and right fixed lenses L3L and L3R, and the left and right movable lenses L4L and L4R. A description of a detailed structure of the image stabilizer unit 2 will be given later.

The front barrels 1L and 1R are coupled with the left and right tops of the image stabilizer unit 2 through bayonet coupling and their positions in the optical axis direction are determined. Reference numeral 3 denotes a positioning pin, and two positioning pins are provided for each of the left side and the right side. The positions of the front barrels 1L and 1R are determined so that the optical axes of the front barrels 1L and 1R can accord with the optical axes of the left and right fixed lenses L3L and L3R in the image stabilizer unit 2. FIG. 5 illustrates that the front barrel 1L is coupled with the image stabilizer unit 2 and the front barrel 1R is disassembled. Among the positioning pins 3 that are provided two each for the left side and the right side, one positioning pin 3 is inserted into reference holes in the front barrels 1L and 1R and the image stabilizer unit 2, and the other positioning pin 3 is inserted into holes in the front barrels 1L and 1R and a groove on the image stabilizer unit 2.

Reference numeral 4 denotes an electric substrate configured to control driving of the image stabilizer unit 2, and integrally fixed onto the image stabilizer unit 2.

Reference numeral 5L denotes an eyepiece barrel configured to hold the left eyepiece lens L6L, and this is true of the eyepiece barrel (not illustrated) configured to hold the right eyepiece lens L6R. Reference numerals 6L and 6R denote prism holders configured to hold the left and right polo II type prisms L5L and L5R. Reference numeral 7L denotes a left eyepiece holder configured to hold the eyepiece barrel 5L, and reference numeral 7R denotes a right eyepiece holder configured to hold the eyepiece barrel configured to hold the right eyepiece lens L6R. The prism holders 6L and 6R and eyepiece holders 7L and 7R are integrated with each other through screws so that the left and right polo II type prisms L5L and L5R and the left and right eyepiece lenses L6L and L6R can have a predetermined positional relationship.

Reference numerals 8L and 8R denote eye guard rubbers attached to left and right eyepiece barrels. Male helicoids screws are formed on the outer circumferential walls of the left and right eyepiece barrels, and female helicoids screws are formed on the internal circumferential walls of the eyepiece barrels 7L and 7R. The left and right diopter scales can be adjusted by rotating and moving back and forth one of the eyepiece barrels in the optical axis direction. The left and right eyepiece units 9L and 9R are thus formed.

Reference numeral 10 denotes a base member as a support configured to rotatably support the left and right eyepiece units 9L and 9R around the optical axes OL and OR of the objective optical systems and to move back and forth both left and right entire objective optical systems in the optical axis directions for focusing according to an observation distance. The base member 10 needs high rigidity and precision, and thus is made of a comparatively thick metal plate.

A portion 10a perpendicular to the optical axes OL and OR of the objective optical system in the base member 10 has openings 10L and 10R coaxial with the optical axes. Cylinders 6La and 6Ra in the prism holders 6L and 6R are rotatably inserted into the openings 10L and 10R.

Reference numerals 11L and 11R denote interlock plates configured to interlock rotations of the cylinders 6La and 6Ra of the prism holders 6L and 6R. The interlock plates 11L and 11R have a plurality of arms 11Lb and 11Rb configured to generate biasing forces in the optical axis direction when incorporated in place. The arms 11Lb and 11Rb are fastened with the prism holders 6L and 6R and the interlock plates 11L and 11R through screws via the portion 10a of the base member 10. In addition, the interlock plates 11L and 11R have gears 11La and 11Ra.

Reference numerals 12L and 12R denote idler gears, and their rotational axes are fixed onto the portion 10a of the base member 10 so as to be engaged with the gears 11La and 11Ra through caulking. By engaging the gears 11La and 11Ra with the idler gears 12L and 12R, the rotations of the eyepiece units 9L and 9R can be interlocked.

FIG. 5 illustrates that the eyepiece unit 9L, the interlock plate 11L, and the idler gear 12L are incorporated into the portion 10a of the base member 10, and the eyepiece unit 9R, the interlock plate 11R, and the idler gear 12R are exploded.

The optical axes EL and ER of the eyepiece optical systems for the eyepiece units 9L and 9R decenter from the optical axes OL and OR of the left and right objective optical system by a predetermined amount by the polo II type prism L5L and L5R. Therefore, by rotating the eyepiece units 9L and 9R, an interval varies between the optical axes EL and ER of the eyepiece optical systems. Thereby, the pupil distance can be adjusted so that the distance between left and right pupils of the observer using the binocular can be accorded with the distance between the optical axes EL and ER of the eyepiece optical system.

Reference numeral 10b denotes a flat portion of the base member 10 as a support parallel to both optical axes OL and OR of the left and right objective optical systems, and configured to move the left and right entire objective optical systems in the optical axis directions for focusing according to the observation distance.

Reference numeral 13 denotes a focus support fixed onto the objective optical system, movably supported relative to the flat portion 10b of the base member 10 in the optical axis direction and guided by the guide mechanism.

Reference numeral 14 denotes a feed screw. Reference numeral 15 denotes an operational dial coupled with the feed screw 14 and its back end. Reference numeral 16 denotes a bearing configured to rotatably support the operational dial 15 coupled with the feed screw 14 at a constant position, and fixed onto the portion 10a of the base member 10 via screws.

Reference numeral 17 denotes a rack engaged with the feed screw 14. Reference numeral 18 denotes a rack spring configured to maintain an engagement by pressing the rack 17 against the feed screw 14. The rack 17 and the rack spring 18 are integrated by the screws, and the rack spring 18 is fixed onto the focus support 13 via the screw. As the operational dial 15 rotates, the focus support 13 can move back and forth in the optical axis direction.

The image stabilizer unit 2 that incorporates the front barrels 1L and 1R of the left and right objective optical systems at its top is integrally fixed onto the focus support 13 by four objective-fixing screws 19. In other words, as the focus support 13 moves back and forth in the optical axis direction and the left and right objective optical system move consequently as a whole, focusing starts in accordance with an observation distance.

Reference numeral 20 denotes a lower cover, and reference numeral 21 denotes an upper cover. The lower cover 20 and the upper cover 21 are integrated by four cover-fixing screws 22 (one of which is not illustrated), accommodate and protect the above left and right optical systems and the mechanical structure.

The lower cover 20 has a battery chamber 20a configured to house a battery for power supply to the electric substrate 4 configured to control driving of the image stabilizer unit 2. In the base member 10, three portions 10c (one of which is not illustrated) are fixed onto the lower cover 20 in place via buffer rubber 23.

The top cover 21 holds the left and right protective glasses L1L and L1R. Reference numeral 24 denotes protective rubber, which covers the outsides of the protective glasses L1L and L1R at the tops of the lower cover 20 and the upper cover 21, and mitigates an impact to the inside due to a drop, etc.

Reference numeral 25 denotes an operational switch configured to switch an operation of the image stabilizer unit 2 between ON and OFF. Reference numeral 26 denotes an LED configured to display the ON state. An overall structure of the binoculars has been thus described.

Figure 1:
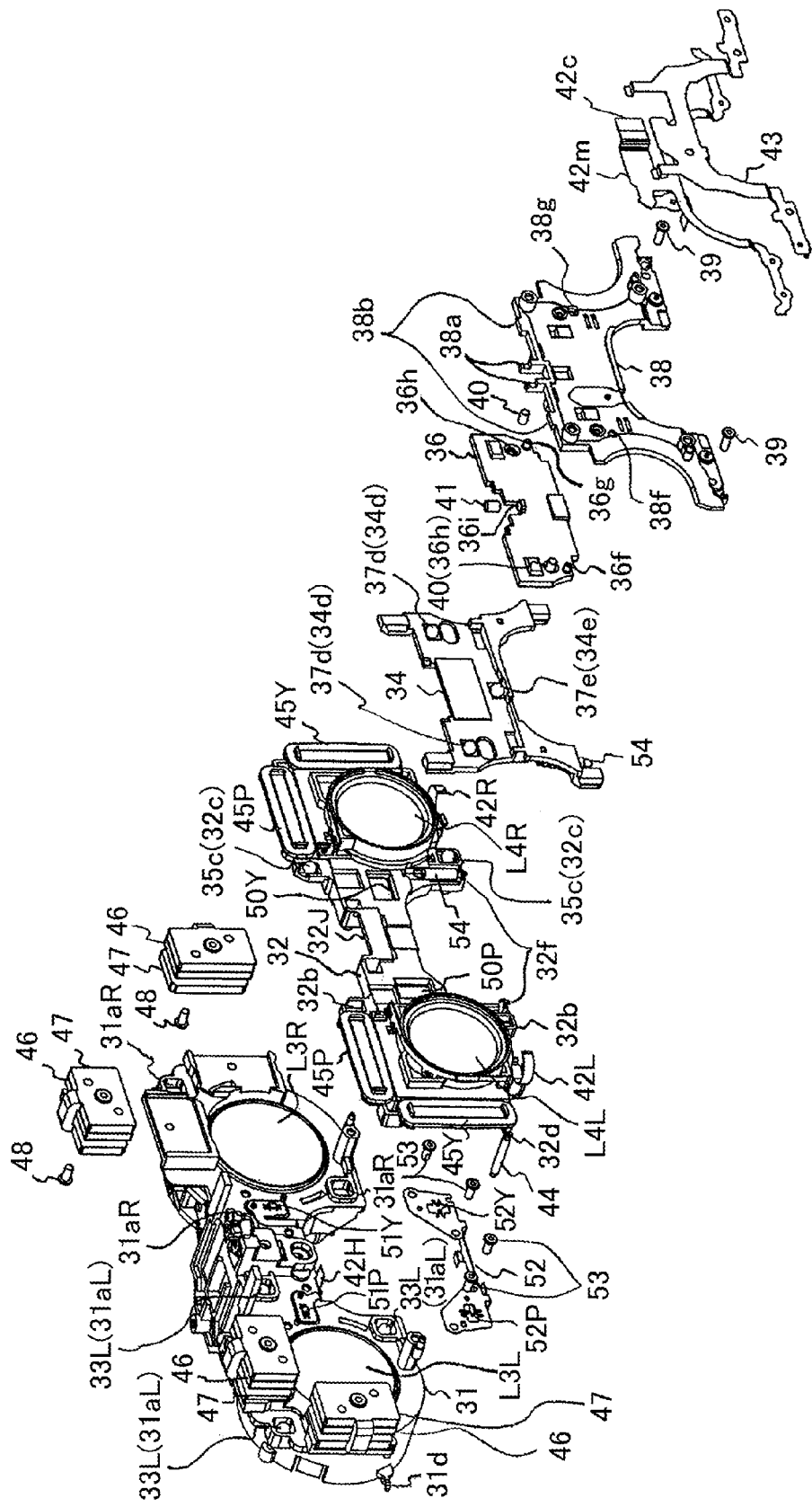
FIG. 1 is an exploded perspective view of a backside an image stabilizer unit according to a first embodiment of the present invention.
Figure 2:
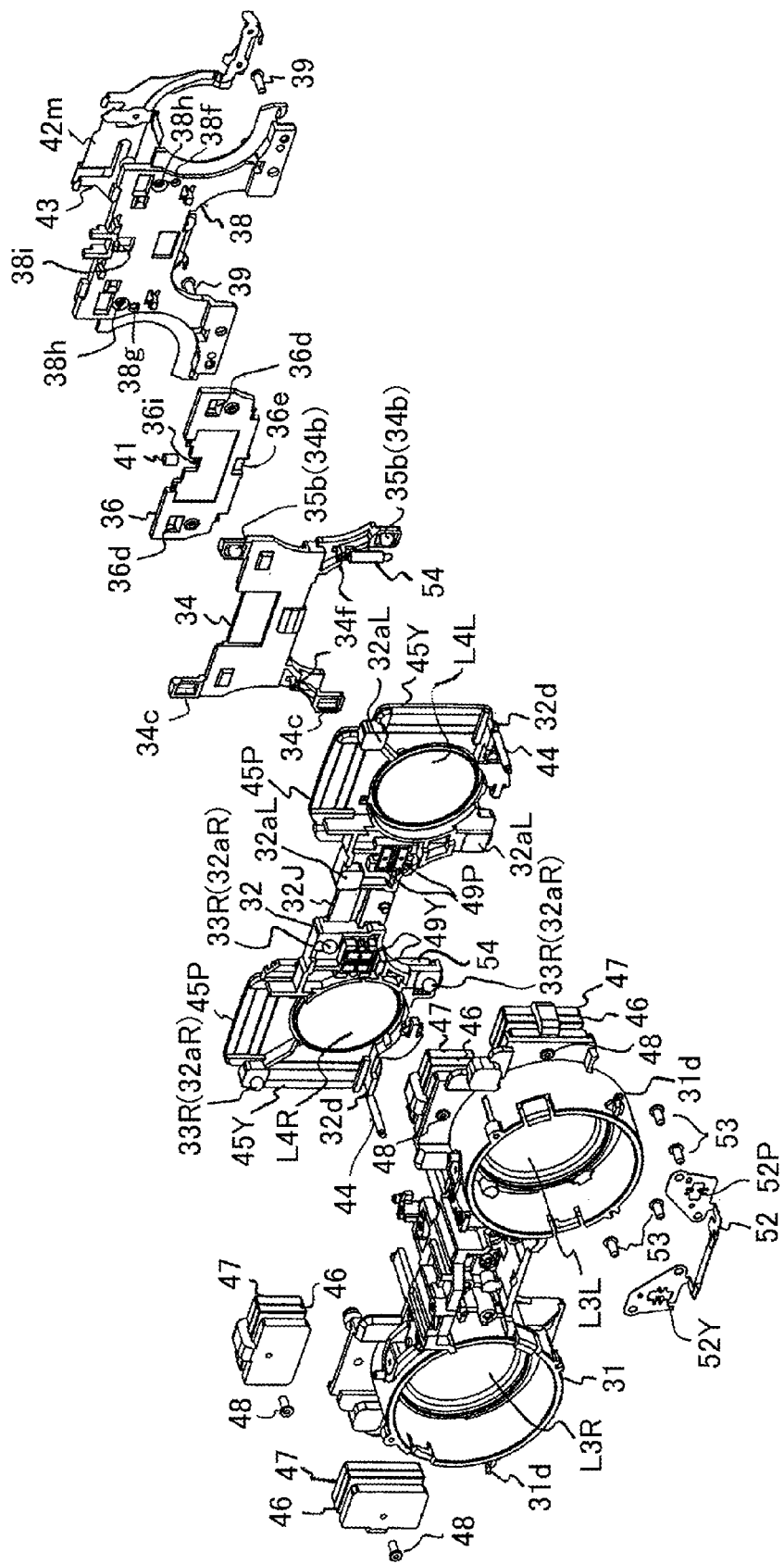
FIG. 2 is an exploded perspective view of a front side of the image stabilizer unit according to the first embodiment.

Referring to FIGS. 1 and 2, a description will now be given of the structure of the image stabilizer unit 2. Initially, a direction in this description will be defined. A lateral direction is defined as a direction that is made by connecting the left and right optical axes relative to the plane perpendicular to the optical axes OL and OR of the left and right objective optical systems. A longitudinal direction is defined as a direction orthogonal to the lateral direction. A backside is defined as a side of the eyepiece optical system, and a front side is defined as the opposite side to the backside. In FIG. 4, an upper side is defined as a side on which the operational dial 15 is located, and an orientation is positive for use of the binoculars in which the plane containing the optical axes OL and OR of the left and right objective optical systems is parallel to the ground as in FIG. 4. FIGS. 1 and 2 illustrate exploded image stabilizer unit 2. FIG. 1 illustrates a back diagonal side, and FIG. 2 illustrates a front diagonal side.

Reference numeral 31 denotes a base barrel as a reference member that serves as a positioning base in the optical axis direction for the movable barrel 32, which will be described later, and holds the left and right fixed lenses L3L and L3R. The movable barrel 32 corresponds to a lens holder, and includes left and right lens holding members configured to hold left and right movable lenses L4L and L4R, and a coupling portion 32J configured to couple the left and right lens holding members with one another. The movable barrel 32 is integrally made of resin. As described later, the coupling portion 32J is flexible so that it can at least bend and twist.

Reference numerals 33L and 33R denote support balls (simply referred to as "balls" hereinafter) provided three each around each of the left and right movable lens L4L and L4R. The left three balls 33L constitute a left ball unit and the right three balls 33R constitute a right ball unit. In FIGS. 1 and 2, three support balls are arranged for each of the left and right movable lens L4L and L4R, but the number is not limited to three and at least three balls are sufficient. The balls 33L and 33R are made of a material, such as stainless steel (SUS 440C) and ceramics. Ceramics is suitable because it is non-magnetic or magnetically attracted and it does not negatively affect the operation and assembly of the image stabilizer unit 2 under the surrounding magnetism.

Reference numerals 31aL and 31aR denote a ball housing provided three each as a concave for the left and right sides of the base barrel 31. The ball housings 31aL and 31aR house the balls 33L and 33R, and each ball rollably contacts the bottom surface (plane). Each ball housing serves to restrict the rollable area.

The reference numerals 32aL and 32aR are ball contact surfaces provided three each for each of the left and right sides of the movable barrel 32, and the balls 33L and 33R can contact the ball surfaces. In other words, the left and right ball units are arranged around the movable lenses L4L and L4R between the base barrel 31 and the movable barrel 32.

Reference numeral 34 denotes a longitudinal guide, and reference numerals 35b and 35c denote longitudinal guide balls provided two each. In the movable barrel 32, reference numeral 32b denotes a guide groove provided for two longitudinal guide balls 35b, and reference numeral 32c denotes a guide groove provided for two longitudinal guide balls 35c. In the longitudinal guide 34, reference numeral 34b denotes a guide groove provided for two longitudinal guide balls 35b, and reference numeral 34c denotes a guide groove provided for two longitudinal guide balls 35c.

The movable barrel 32 and the longitudinal guide 34 hold the longitudinal guide balls 35b and 35c between the guide grooves 32b and 34b and the guide grooves 32c and 34c, and allow these balls to move only in the longitudinal direction.

Reference numeral 36 denotes a lateral guide, and reference numerals 37d and 37e denote lateral guide balls. There are two lateral guide balls 37d and one lateral guide ball 37e. In the lateral guide 36, 36d denotes a guide groove provided for the two lateral guide balls 37d, and reference numeral 36e denotes a guide groove provided to the lateral guide ball 37e. The longitudinal guide 34 and the lateral guide 36 hold the lateral guide balls 37d and 37e between the guide grooves 34d and 36d and the guide grooves 34e and 36e so that these balls can move only in the lateral direction.

Reference numeral 38 denotes a back base. The back base 38 holds a corresponding surface of the base barrel 31 through a top surface 38a that faces the backside and a top surface 38b that faces the front side, and is integrated with the base barrel 31 with two fixture screws 39.

Reference numerals 36f and 36g denote positioning pins provided on the back surface of the lateral guide 36. There are a positioning hole 38f corresponding to the positioning pin 36f with a slight clearance from the positioning pin 36f and a positioning long hole 38g corresponding to the positioning pin 36g with a slight clearance from the positioning pin 36g. The lateral guide 36 is movably positioned in the optical axis direction relative to the back base 38.

Reference numeral 40 denotes a forward forcing spring arranged on each of the left side and the right side. The forward forcing spring 40 is a compression coil spring, and has both ends engaged with a circular concave 36h provided in the lateral guide 36 and a circular concave 38h provided in the back base 38. The forward forcing spring 40 applies a forward biasing force to the lateral guide 36 against the fixed back base 38 in the optical direction using as a guide the positioning pins 36f and 36g, the positioning hole 38f, and the positioning long hole 38g.

Reference numeral 41 denotes a rotationally forcing spring. The rotationally forcing spring 41 is a compression coil spring, and has both ends engaged with a cylindrical projection of a seating surface 36i of the lateral guide 36 and a cylindrical projection of a seating surface 38i of the back base 38. The rotationally forcing spring 41 applies a downward biasing force to the lateral guide 36 against the fixed back base 38.

Figure 6:
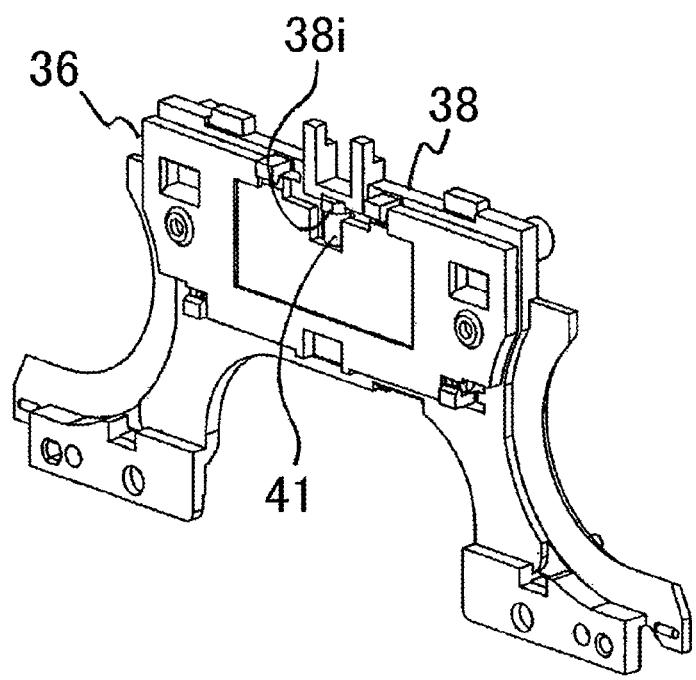
FIG. 6 is a perspective view of a front side of the image stabilizer unit in an assembly state between a lateral guide and a back base according to the first embodiment.
Figure 7:
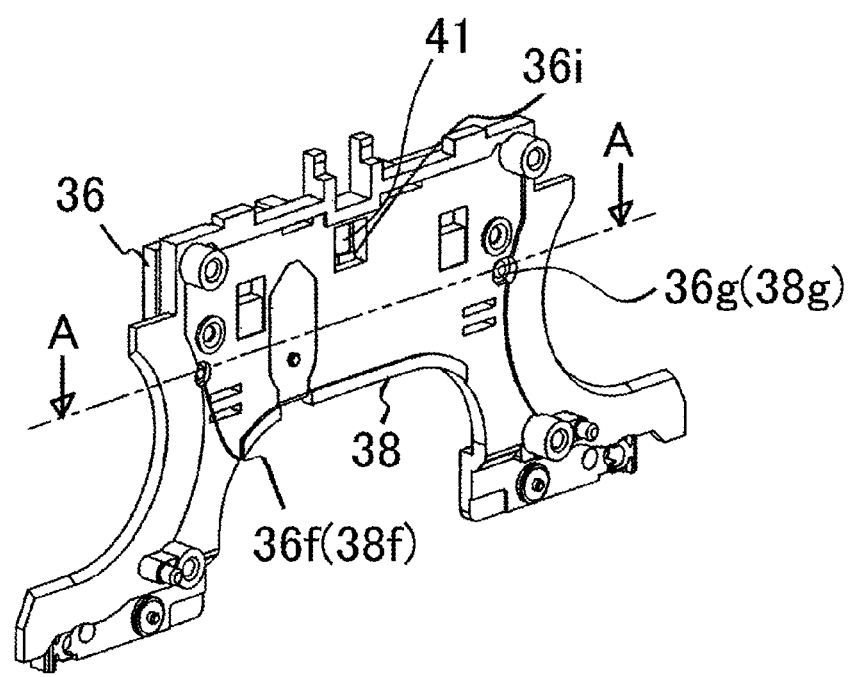
FIG. 7 is a perspective view of a backside of the image stabilizer unit in an assembly state between a lateral guide and a back base according to the first embodiment.

Referring now to FIGS. 6 and 7, a description will be given of a relationship between the lateral guide 36 and the back base 38. FIGS. 6 and 7 illustrate a front diagonal side and a back diagonal side of the incorporated lateral guide and back base.

As illustrated in FIG. 6, in an assembly state between the lateral guide 36 and the back base 38, the seating surfaces 36i and 38i as attachment seating surfaces of the rotationally forcing spring 41 are arranged approximately opposite to each other in the longitudinal direction, and the rotationally forcing spring 41 applies a downward biasing force to the lateral guide 36.

As illustrated in FIG. 7, the positioning pins 36f and 36g configured to guide the lateral guide in the optical axis direction are pressed against the positioning hole 38f and the positioning long hole 38g in the arrow A direction by the biasing force of the rotationally forcing spring 41. This configuration restricts an orientation change of the lateral guide 36 in the rotation direction.

In FIGS. 1 and 2, reference numeral 42m denotes a part of a flexible substrate used to electrically connect an electric device mounted on the image stabilizer unit 2 with the electric substrate 4 described with reference to FIG. 5. Reference numeral 42c denotes an inlet of a connector (not illustrated) mounted on the electric substrate 4. Reference numeral 43 denotes a flexible press plate configured to fix the flexible substrate 42m.

Reference numeral 44 denotes left and right movable-barrel forcing springs. The movable-barrel forcing spring 44 is a tension coil spring, has both ends hooked with a hook 32d of the movable barrel 32 and a hook 31d of the base barrel 31, and forwardly attracts the movable barrel 32 relative to the base barrel 31. A specific operation of the movable-barrel forcing spring 44 will be described later.

A description will now be given of an actuator configured to move the movable barrel 32 in two directions on a plane orthogonal to the optical axis direction and a position detection of the actuator in the image stabilizer unit 2. Reference numeral 45P denotes left and right driving coils configured to generate a longitudinal driving force. Reference numeral 45Y denotes left and right driving coils configured to generate a lateral driving force. The driving coils 45P and 45Y are bonded to the movable barrel 32.

The reference numerals 42L and 42R denote parts of the flexible substrate connected to the flexible substrate 42m. The flexible substrate 42L is connected to the left driving coils 45P and 45Y, and the flexible substrate 42R is connected to the right driving coils 45P and 45Y. Each driving coil is supplied with power from the electric substrate 4 via the inlet 42c of the flexible substrate 42m.

Reference numeral 46 denotes a driving magnet, 47 denotes a driving yoke configured to form a magnetic circuit by closing a magnetic flux generated by the driving magnet 46. The driving yoke 47 includes a back yoke 47a arranged on the rear surface of the driving magnet 46, and an opposite yoke 47b configured to from an air layer and obtains a driving force in the driving coil 45P.

The driving magnet 46 and the driving yoke 47 are provided onto the driving coils 45P and 45Y. The driving magnet 46 has two upper and lower magnetic areas, as illustrated in FIG. 4, for the driving coil 45P. Each magnetic area is magnetized and forms the N pole and the S pole in the front and back direction while the N pole and the S pole are reversely arranged in the front and back direction in these two magnetic areas. The driving magnet 46 has two longitudinal magnetic areas (see FIGS. 1 and 2) for the driving coil 45Y. Each magnetic area is magnetized and forms the N pole and the S pole in the front and back direction while the N pole and the S pole are reversely arranged in the front and back direction in these two magnetic areas.

The driving magnet 46 and the driving yoke 47 provided to the driving coils 45P and 45Y are held on the base barrel 31 as a result of that the driving yoke 47 is fixed onto the base barrel 31 through the fixture screws 48. The driving coils 45P and 45Y and the driving magnet 46 and the driving yoke 47 provided to the driving coils 45P and 45Y constitute an actuator configured to move the movable barrel 32 in the plane orthogonal to the optical axis direction in the longitudinal direction and in the lateral direction.

Reference numeral 49P denotes a sensor magnet set configured to produce positional information of the movable barrel 32 in the longitudinal direction, and reference numeral 49Y denotes a sensor magnet set configured to produce positional information of the movable barrel 32 in the lateral direction. Sensor back yokes 50P and 50Y are provided on the back surfaces of the sensor magnet sets 49P and 49Y, and each sensor magnet set is fixed onto the movable barrel 32 by holding the movable barrel 32 between the front side and the rear side using the magnetic attraction force.

The sensor magnet set 49P has two upper and lower magnets, and each magnet has the same rectangular-parallelepiped magnet having a long width in the lateral direction. The N pole and S pole are reversely arranged in the front and back direction in these two upper and lower magnets. The sensor back yoke 50P closes a magnetic path on the back surface side of these two upper and lower magnets.

The sensor magnet set 49Y has two left and right magnets, and each magnet has a rectangular-parallelepiped magnet having a long width in the longitudinal direction. The N pole and S pole are reversely arranged in the front and back direction in these two left and right magnets. The sensor back yoke 50Y closes a magnetic path on the back surface side of these two left and right magnets.

Reference numeral 51P denotes a Hall element arranged opposite to the sensor magnet set 49P, and configured to output a signal corresponding to a longitudinal movement of the movable barrel 32. Reference numeral 51Y denotes a Hall element arranged opposite to the sensor magnet set 49Y, and configured to output a signal corresponding to a lateral movement of the movable barrel 32. Reference numeral 42H is a part of the flexible substrate and connected to the flexible substrate 42m. The Hall elements 51P and 51Y are mounted on the flexible substrate 42H. Reference numeral 52 denotes a sheet metal used to position the Hall element and to press the flexible substrate 42H. The sheet metal 52 is fixed onto the base barrel 31 through four fixture screws 53 after the Hall elements 51P and 51Y are positioned by the openings 52P and 52Y. The positional information of the movable barrel 32 in the longitudinal direction and in the lateral direction can be obtained by utilizing outputs from the Hall elements 51P and 51Y.

Reference numeral 54 denotes left and right self-weight supporting springs. The self-weight supporting spring 54 is a tension coil spring, and has both ends engaged with a hook 34f of the longitudinal guide 34 and a hook 32f of the movable barrel 32. The longitudinal guide 34 can move relative to the lateral guide 36 only in the lateral direction. The lateral guide 36 can move relative to the back base 38 only in the front and back direction. In other words, the self-weight supporting spring 54 can lift the movable barrel 32 relative to the longitudinal guide 34 upwardly.

The left and right movable lenses L4L and L4R, the driving coils 45P and 45Y, the sensor magnet sets 49P and 49Y, and the sensor back yoke 50P and 50Y etc. are attached to the movable barrel 32. The power supplied to the driving coil 45P can be reduced in the normal use state by setting up a spring force of the self-weight supporting spring 54 so that the movable barrel 32 having a weight determined by these components can be positioned near the movable center position in the longitudinal direction when the binoculars are located in the positive orientation.

Figure 8:
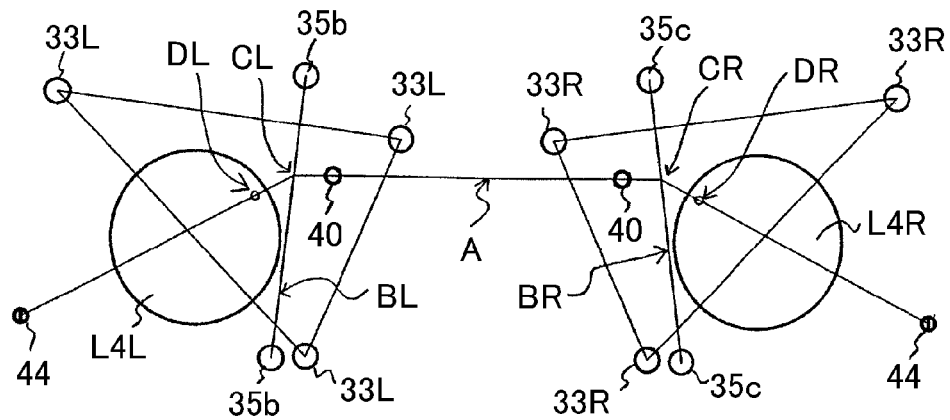
FIG. 8 is a view for explaining a relationship between balls and biasing forces in the image stabilizer unit according to the first embodiment.

Referring now to FIG. 8, a description will be given of a relationship among the ball units, the forward forcing springs 40, and the movable-barrel forcing springs 44. The left and right forward forcing springs 40 are compressed between the back base 38 and the lateral guide 36 and generate a (forward) biasing force in the optical axis direction. This biasing force is applied to the longitudinal guide 34 via the lateral guide balls 37d and 37e through the lateral guide 36, and transmitted to the longitudinal guide balls 35b and 35c. In other words, the movable barrel receives a biasing force in the optical axis direction directly by the longitudinal guide balls 35b and 35c.

A resultant force of the biasing forces generated by the left and right forward forcing springs 40 operates at a node CL between a line A that connects centers of these forward forcing springs 40 and a line BL that connects the two longitudinal guide balls 35b, and at a node CR between the line A and a line BR that connects the two longitudinal guide balls 35c. In addition, the movable barrel 32 is drawn ahead by the left and right movable-barrel forcing springs 44. A resultant force between the biasing forces generated by the left and right movable-barrel forcing spring 44 and the left and right forward forcing springs 40 operates at points DL and DR that are located on lines that connect the nodes CL and CR and the centers of the left and right movable-barrel forcing spring 44.

The points DL and DR are located inside of the three balls (33L, 33R) in each of the left and right ball units or inside of a triangular area that has vertexes at three balls. Thereby, the compression force applied to the movable barrel 32 against these three balls can be made almost equivalent. Moreover, the compression force applied to these three balls can be made equivalent more precisely by approaching the points DL and DR to the center of gravity of the above triangle.

Thus, this embodiment constitutes left and right biasing members using the left and right forward forcing springs 40 and the left and right movable-barrel forcing springs 44. However, the movable-barrel forcing spring 44 is not always required because it is provided to more properly maintain the operating positions of the left and right biasing forces.

As described above, the movable barrel 32 is made by the space between the lens holders configured to hold the left and right movable lenses L4L and L4R using the coupling portion 32J.

It is comparatively easy to maintain the mechanical precision necessary for the heights of the three ball contact surfaces 32aL in the optical axis direction which are provided around the movable lens L4L in the movable barrel 32. It is unnecessary to make equal the heights of the three ball contact surfaces 32aL, and the lens intervals with the opposite fixed lens L3L and relative inclinations may fall upon a permissible range of the optical performance. On the other hand, it is difficult to make equal the heights of the three ball contact surfaces 32aL. This is true of the ball contact surface 32aR provided around the movable lens L4R.

In addition, it is difficult to make equal the heights of the bottom surface of the three ball housings 31aL in the optical axis direction, which are provided around the fixed lens L3L in the base barrel 31. This is true of the ball housing 31aR provided around the fixed lens L3R.

Hence, even when the base barrel 31 and the movable barrel 32 are incorporated in position, it is extremely difficult to bring the six balls 33L and 33R into contact with their reception surfaces or the ball contact surfaces 32aL and 32aR and the bottom surfaces of the ball housings 31aL and 31aR. If the movable barrel 32 is a wholly highly rigid member that never deforms, even when the forward forcing springs 40 and the movable-barrel forcing springs 44 apply biasing forces to it, only three out of six balls can contact the ball contact surfaces 32aL and 32aR and the ball housings 31aL and 31aR.

In this state, it is highly likely that the movable barrel 32 becomes unsteady in the optical axis direction, and intervals between the movable lens L4L and L4R and the fixed lenses L3R and L3R vary or the movable lens L4L and L4R incline relative to the optical axes of the left and right optical systems.

Accordingly, this embodiment uses such a flexible coupling portion 32J of the movable barrel 32 that the coupling portion 32J can bend or twist in response to the biasing forces by the forward forcing springs 40 and the movable-barrel forcing springs 44. As the coupling portion 32J deforms in response to the above biasing forces, the balls 33L and 33R that are provided three each for the left and right can contact the ball contact surfaces 32aL and 32aR of the movable barrel 32, and the bottom surfaces of the ball housings 31aL and 31aR of the base barrel 31. As a result, the intervals between the movable lenses L4L and L4R and the fixed lenses L3R and L3L can be maintained constant. In addition, the inclinations of the movable lenses L4L and L4R relative to the optical axes of the left and right optical systems can be prevented. When there are four or more left and right supporting balls, at least three supporting balls may contact the movable barrel 32 for the left and right sides.

Figure 9:
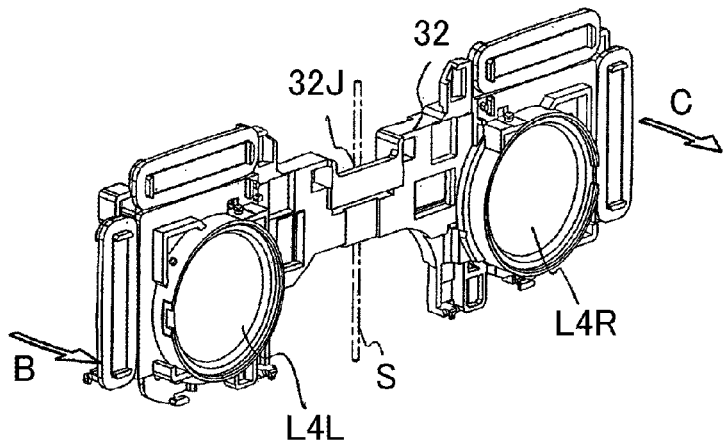
FIG. 9 is a perspective view for explaining bending of a coupling portion of a movable barrel in the image stabilizer unit according to the first embodiment.
Figure 10:
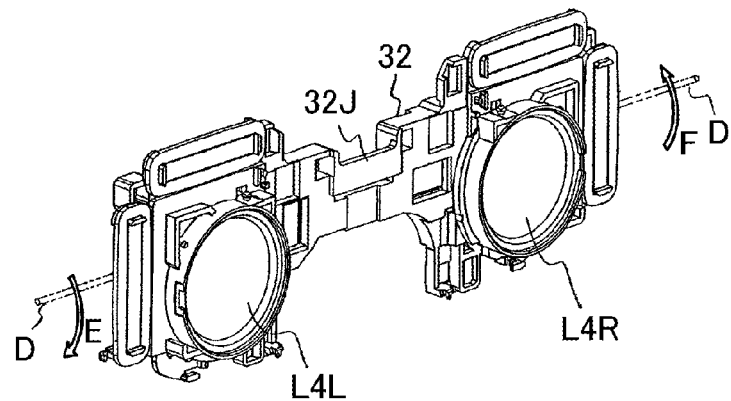
FIG. 10 is a perspective view for explaining twisting of the coupling portion.

FIGS. 9 and 10 illustrate the flexibility of the coupling portion 32J of the movable barrel 32. In FIG. 9, the coupling portion 32J bends. In FIG. 10, the coupling portion 32J twists.

In FIG. 9, "S" denotes a center axis of a displacement when the left and right movable lenses L4L and L4R displace (bend) in an arrow B and C directions as the coupling portion 32J bends. In FIG. 10, "D" denotes a center axis of a displacement when the left and right movable lenses L4L and L4R displace (twist) in an arrow E and F directions as the coupling portion 32J twists. Actually, bending and twisting complexly occur and the balls 33L and 33R that are provided three each for the left and right can contact the ball contact surfaces 32aL and 32aR of the movable barrel 32 and the bottom surfaces of the ball housings 31aL and 31aR of the base barrel 31.

Figures 11A, 11B:
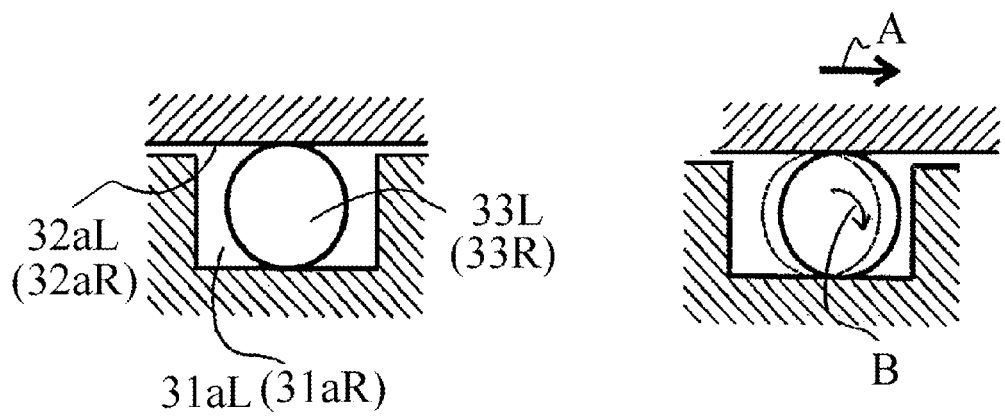
FIGS. 11A and 11B are views for explaining a relationship among balls, a base barrel, and the movable barrel in the image stabilizer unit according to the first embodiment.

FIG. 11 illustrates a relationship among the balls 33L and 33R, the base barrel 31, and the movable barrel 32. In FIGS. 11A and 11B, the ball 33L (33R) contacts the bottom surfaces of the ball housings 31aL (31aR) of the base barrel 31, and the ball contact surface 32aL (32aR) of the movable barrel 32 due to the above biasing forces.

FIG. 11A illustrates that the ball 33L (33R) is located at almost the center in the rollable area of the ball 33L (33R) restricted by the wall part in the ball housing 31aL (31aR), and the movable barrel 32 is located at the center of the moveable range. FIG. 11B illustrates that the movable barrel 32 moves in the arrow A direction from the position illustrated in FIG. 11A. At this time, the ball 33L (33R) contacts the bottom surface of the ball housing 31aL (31aR) and the ball contact surface 32aL (32aR), and rolls in the arrow B direction without sliding. In FIG. 11B, a circle illustrated by an alternate long and two short dashes line denotes a position of the ball 33L (33R) illustrated in FIG. 11A. Thus, in moving the movable barrel 32, only the roll friction occurs rather than the sliding friction. Since the rolling friction is much smaller than the sliding friction, the driving resistance of the movable barrel 32 can become small. This is advantageous to fine driving of the movable barrel 32 by the actuator.

Figure 12A:
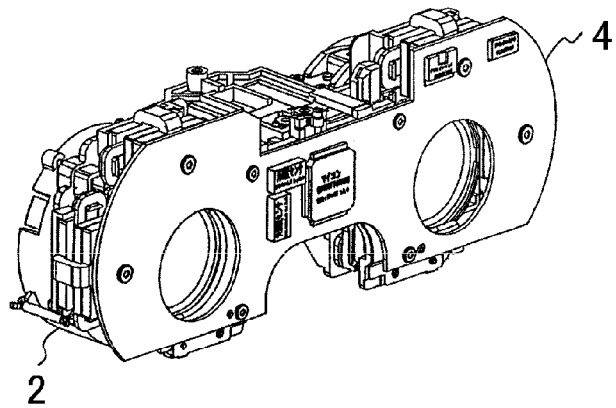
FIGS. 12A and 12B are perspective views of an electric substrate and the image stabilizer according to the first embodiment.
Figure 12B:
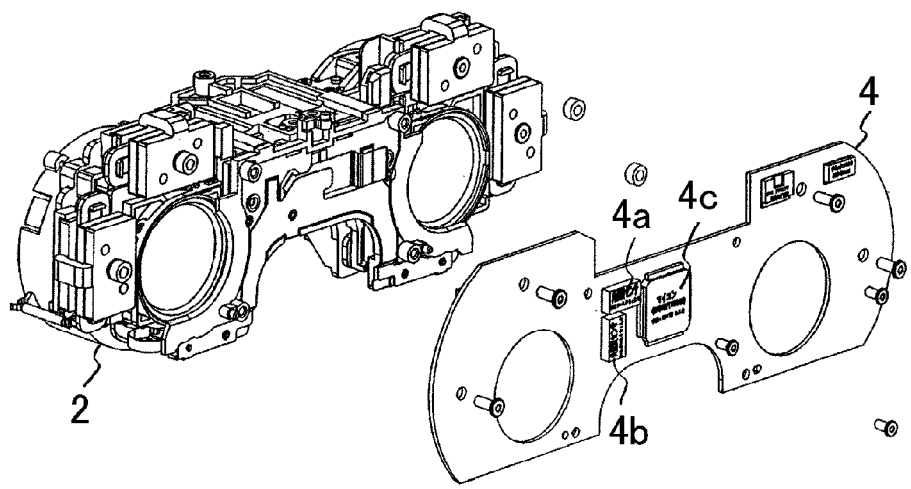

As illustrated in FIGS. 12A and 12B, the electric substrate 4 configured to control driving of the image stabilizer unit 2 is integrally attached to the image stabilizer unit 2 by screws. The electric substrate 4 is mounted with vibration detectors 4a and 4b, such as a vibration gyro, configured to detect an angular velocities in the longitudinal direction and in the lateral direction of the binoculars. Reference numeral 4c denotes a microcomputer configured to control electrifications to the driving coils 45P and 45Y based on the information of the angular velocities from the vibration detectors 4a and 4b, and to move the movable barrel 32 in the longitudinal direction and in the lateral direction, thereby stabilizing an image.

Second Embodiment

Figure 13A:
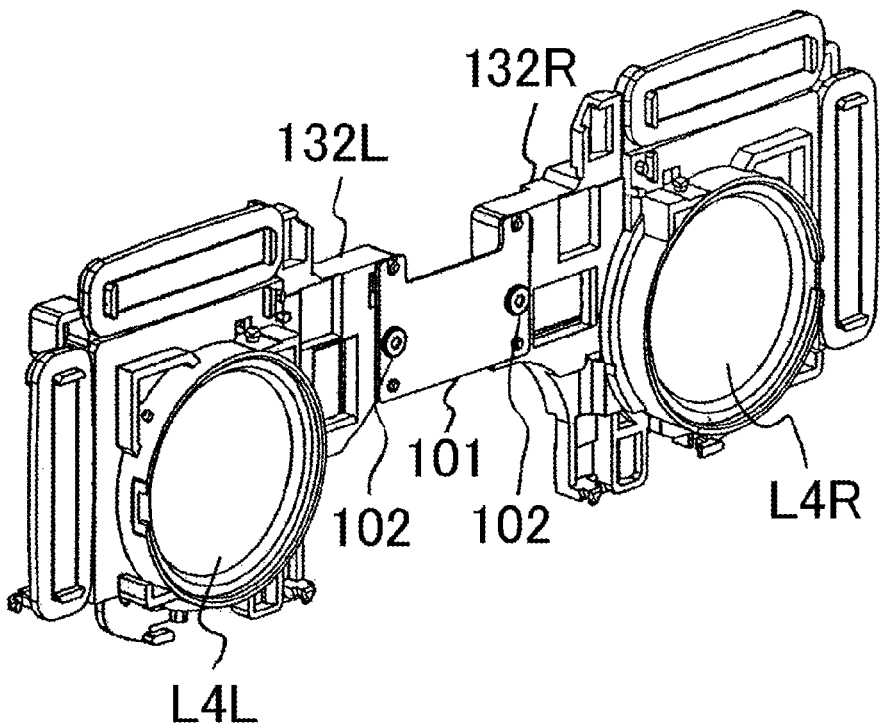
FIGS. 13A and 13B are perspective views of the movable barrel in an image stabilizer unit according to a second embodiment of the present invention.
Figure 13B:
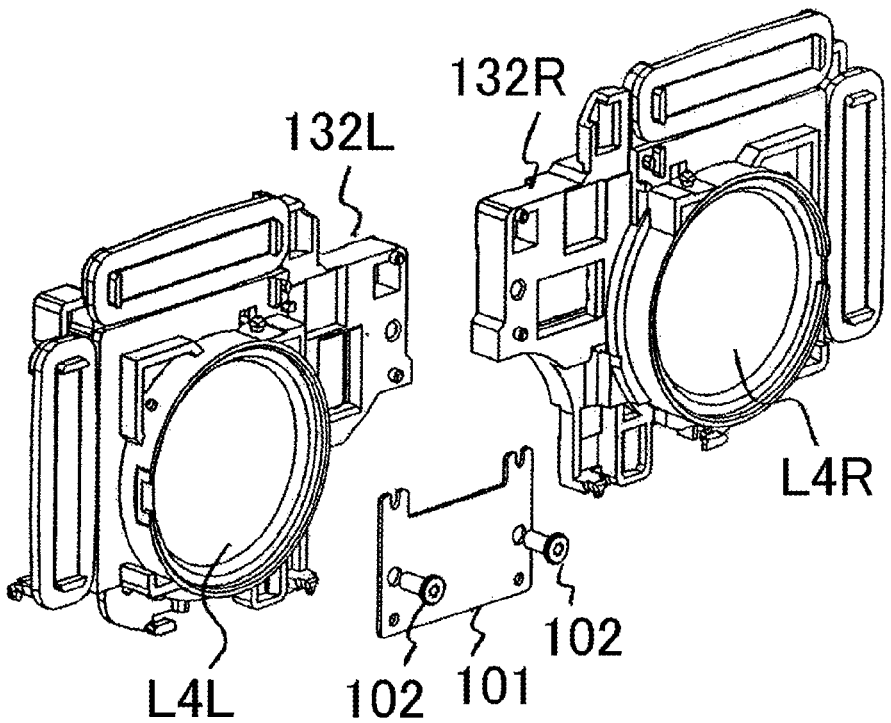

FIGS. 13A and 13B illustrate a movable barrel of an image stabilizer unit used for binoculars according to a second embodiment of the present invention. The configuration in this embodiment other than the movable lens is the same as that in the first embodiment.

Reference numeral 132L denotes a left holder barrel (lens holder) configured to hold the left movable lens L4L, and reference numeral 132RL denotes a left holder barrel (lens holder) configured to hold the right movable lens L4R. Reference numeral 101 denotes a coupling plate attached to the left and right holder barrels 132L and 132R with two screws 102 after it is positioned by the positioning pin provided on the left and right holder barrels 132L and 132R. Thereby, the coupling plate 101 integrates the left and right holder barrels 132L and 132R with each other.

Thus, the movable barrel may be integrated by using the holder barrels 132L and 132R and the coupling plate 101, while the holder barrels 132L and 132R are other members configured to hold the left and right movable lens L4L and L4R.

The coupling plate 101 is made of a thin metallic plate, and is flexible similar to the coupling portion 32J of the movable barrel 32 in the first embodiment so that the coupling plate 101 can at least bend and twist. Due to this flexibility, similar to the first embodiment, the balls 33L and 33R that are provided three each for each of the left side and the right side can contact the ball contact surfaces 32aL and 32aR of the movable barrel 32, and the bottom surfaces of the ball housing 31aL and 31aR of the base barrel 31.

The present invention can provide binoculars configured to reduce driving resistance of a lens holder in an image stabilizing function and to enables both eyes to observe good optical images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-219773, filed Sep. 24, 2009 which is hereby incorporated by reference herein in its entirety.

What is claimed is:

1. Binoculars comprising:
a left optical system that includes a left image stabilizing lens;
a right optical system that includes a right image stabilizing lens;
a lens holder configured to move in a direction orthogonal to an optical axis direction, the lens holder including a left lens holding member configured to hold the left image stabilizing lens, a right lens holding member configured to hold the right image stabilizing lens, and a coupling portion configured to couple the left and right lens holding members to each other;
a reference member configured to serve as a positioning reference in an optical axis direction for the lens holder;
a left ball unit provided with at least three left balls, wherein each left ball is located around the left image stabilizing lens between the lens holder and the reference member, and configured to roll in accordance with a movement of the lens holder;
a right ball unit provided with at least three right balls, wherein each right ball is located around the right image stabilizing lens between the lens holder and the reference member, and configured to roll in accordance with a movement of the lens holder;
a left biasing member configured to apply a first biasing force to the left lens holding member to press the left lens holding member against the left balls; and
a right biasing member configured to apply a second biasing force to the right lens holding member to press the right lens holding member against the right balls,
wherein the coupling portion is flexible to bend and twist so that all of the at least three balls of the ball units, which are located around each of the right and left image stabilizing lenses, contact the lens holder in response to the biasing force of the biasing members.

2. The binoculars according to claim 1, wherein the left biasing member applies the first biasing force to the left lens holding member from a position inside of an enclosed area defined by vertices formed by the at least three left balls and the right biasing member applies the second biasing force to the right lens holding member from a position inside of an enclosed area defined by vertices formed by the at least three right balls.

3. The binoculars according to claim 1, wherein the coupling portion is bendable and twistable.

4. The binoculars according to claim 1, wherein the coupling portion is made of a bendable and twistable metallic plate.

5. The binoculars according to claim 1, wherein the coupling portion is shaped to be more flexible than the right and left lens holding members, or is made of a member that is different from the right and left lens holding members and is more flexible than the right and left lens holding members.

\* \* \* \* \*